June 17, 1924.
D. R. HARRINGTON
CONNECTING ROD BORING DEVICE
Filed Jan. 6 1921   3 Sheets-Sheet 1
1,497,904
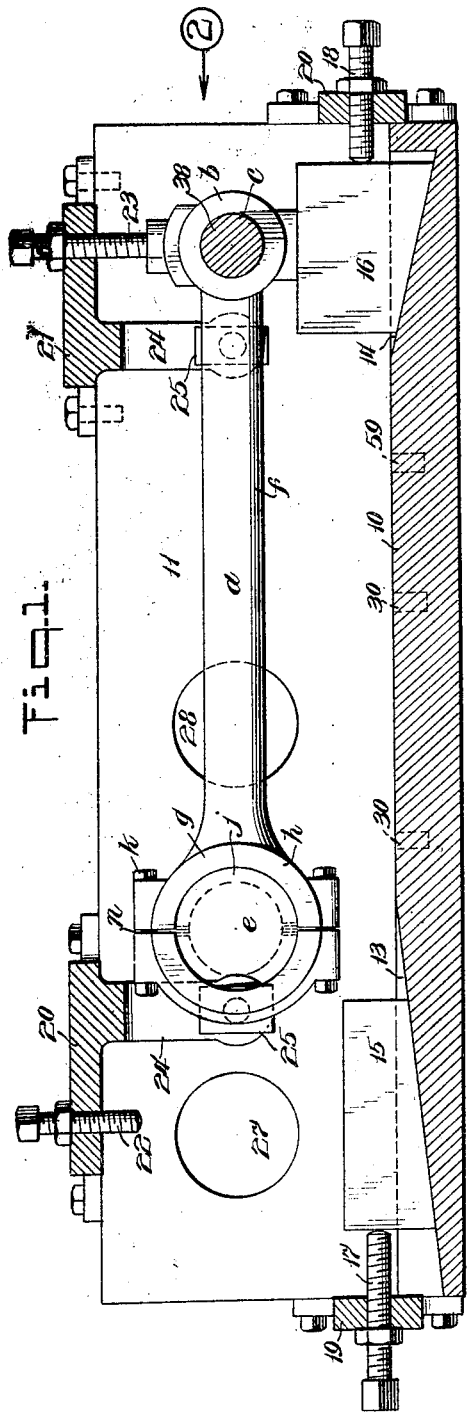
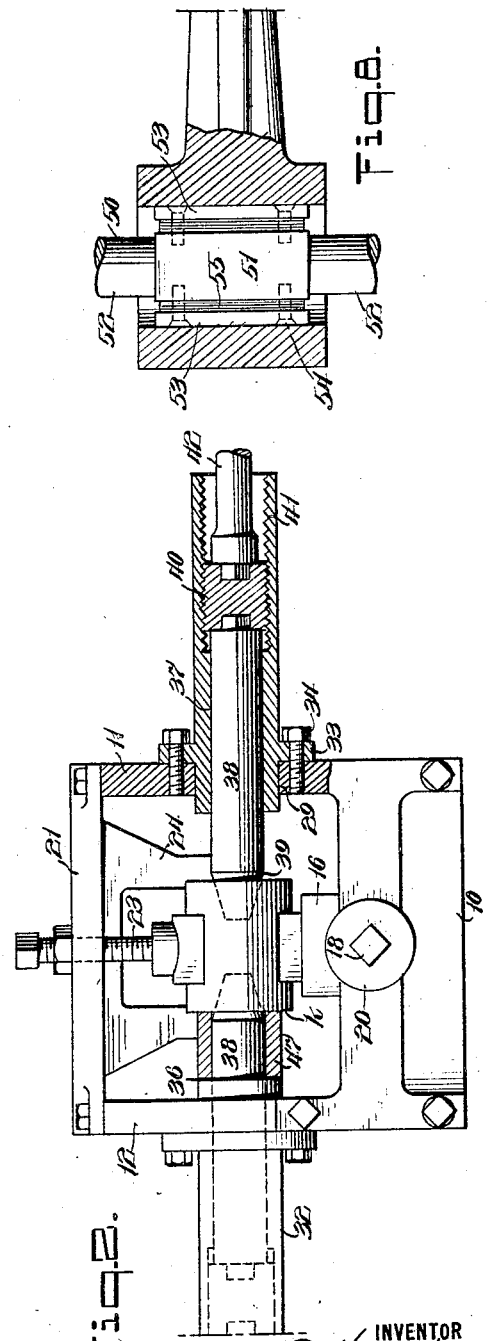
INVENTOR
David R. Harrington
BY
Warren S. Orton
ATTORNEYS

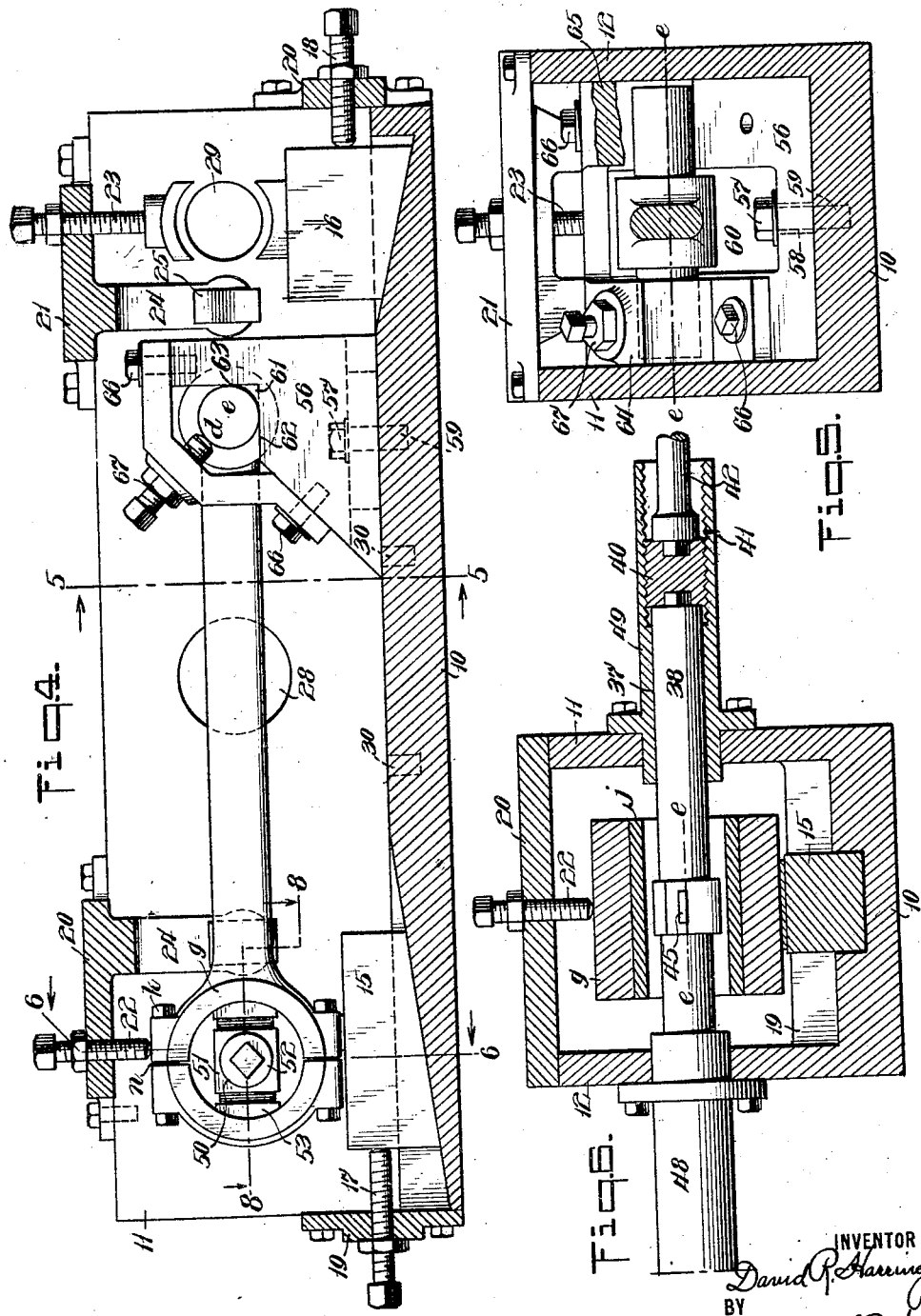

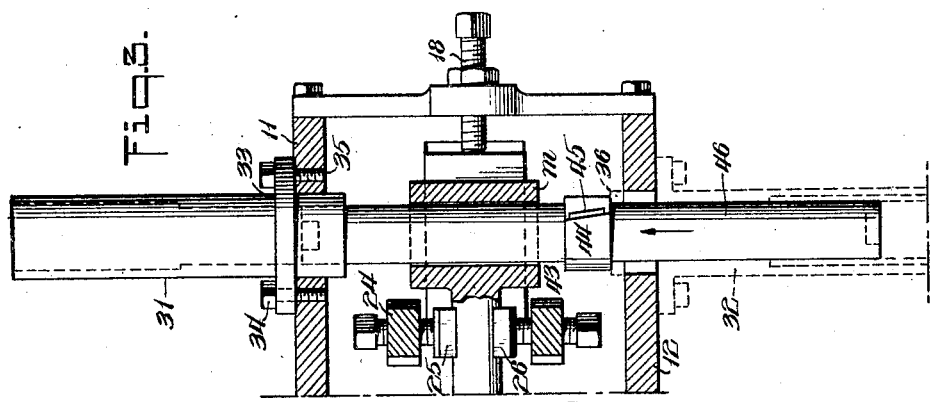

Patented June 17, 1924.

1,497,904

UNITED STATES PATENT OFFICE.

DAVID R. HARRINGTON, OF ELMHURST, NEW YORK.

CONNECTING-ROD-BORING DEVICE.

Application filed January 6, 1921. Serial No. 435,410.

*To all whom it may concern:*

Be it known that I, DAVID R. HARRINGTON, a citizen of the United States, and resident of Elmhurst, in the county of Queens and State of New York, have invented certain new and useful Improvements in Connecting-Rod-Boring Devices, of which the following is a specification.

The invention relates primarily to an improved method of machining certain work parts in accurate relation to each other in accordance with the theoretical requisites of such machining and relates secondarily to a tool carrying jig for practicing the method and specifically for insuring accuracy in machining the bearings in a connecting rod of the type usually found in internal combustion engines of the sliding piston type such as are used in automotive power plants.

While the application of the invention herein disclosed is particularly designed for use in connection with the repairing of worn or damaged connecting rods, it will be obvious from the following description that it is applicable for use in machining new connecting rods, and, as a matter of fact, the device is designed for use in any similar situation where it is necessary to provide drillings with their axes in absolute parallelism and spaced definite distances apart.

In connection with the construction of engine connecting rods, it is readily appreciated that after an engine has been running for some time the wearable parts of the bearings and like frictional surfaces wear away at different rates and in different places, so that, when a set of connecting rods is removed from the engine, it not infrequently happens that the original parallelism between bearings is distorted, and even the rod in its entirety is very apt to be twisted or strained out of its original or theoretically perfect position.

One of the objects of the invention is to suggest a conveniently actuated method of procedure which can be practiced on a machine of the above mentioned character, and which will result in machining the bearings quickly with the bearings disposed accurately parallel to each other, with any desired diameter of boring and with the axes at right angles to the length or line of thrust on the rod. The practicing of the method suggested will maintain equal distances between centers in all of the rods of one set, will balance the connecting rods of one set and will permit variations between the machining of rods of different sets.

Still another object of the invention is to provide a machine of the class outlined which can accommodate connecting rods of different sizes, which is designed to accommodate tools of different characters, dependent upon the type of machining to be performed and which can be utilized in testing the accuracy of parts which are presumed to have a definite relation.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a vertical sectional view taken along the longitudinal vertical medial plane of the machine, illustrating some of the mechanical features of the disclosure, and showing the connecting rod in position with the centering device locating the wrist pin bearing;

Figure 2 is an end view of the right hand side of the device looking at the machine in Figure 1 from the position indicated by the numbered arrow 2 and with parts of one of the tool guides and a centering bushing shown in axial section and showing the first step of the method feature of the invention;

Figure 3 is a horizontal sectional view of the device at the right hand side of the showing in Figure 1 taken in section axially of the wrist pin bearing and showing the second step of the operation with a cutting tool in position to machine the wrist pin bearing;

Figure 4 is a view similar to Figure 1 with the connecting rod in position to center the bearing brasses at the crank pin bearing of the rod and shown with the locating guide in position and the piston pin locked to the sliding jig constituting the fourth step of the process;

Figure 5 is a vertical sectional view taken on the line 5—5 of Figure 4 showing the piston pin locked in seated position on the sliding jig;

Figure 6 is a vertical sectional view taken on the line 6—6 of Figure 4 showing the brasses halves in position, a cutting tool in place of the locating tool of Figure 5 and illustrating the final step of the method.

Figure 7 is a view in side elevation of the device showing with the parts arranged as shown in Figure 6 and Figure 8 is a detailed view of the bearing brasses showing the locating guide in position when taken on the line 8—8 of Figure 4.

In the following description and in the claims, parts will be identified by specific names for convenience of expression but they are intended to be as generic in their application to similar parts as the art will permit.

The work to be machined is the conventional form of connecting rod $a$ provided at one end with a piston pin head $b$ having a bearing $c$ in which is loosely mounted the piston or wrist pin $d$ with its axis $e$ extending at right angles to the length of the shank $f$ of the rod. At the opposite end the rod is provided with the bushings receiving head $g$ formed of the yoke end $h$ of the rod and a cap $i$ between which is usually positioned the bearing halves $j$ secured in place by bolts $k$ passing through the cap and yoke. For convenience of reference it is considered that the axis of the crank pin bearing in the bushings or shell $j$ indicated at $e$—$e$ (See Fig. 6) coincides with the axis of the shell bearing but of course in practice this will seldom be true. It is usual in the formation of such rods to machine one end $m$ of the head $b$ to extend in a plane parallel to the longitudinal axis or line of thrust of the connecting rod which axis is at right angles to the axis $e$—$e$ and to the axis $l$—$l$.

The method of machining the connecting rod bearings will be most readily described in connection with the physical embodiment of the machine herein disclosed and which machine is designed, with the proper attachments, to be utilized not only to machine the connecting rods as disclosed in the present application but is also designed to machine bearings for other parts of the engine as is more fully disclosed in my copending application Serial No. 435,411, filed under even date and entitled Method and apparatus for machining crank casing bearings.

In the accompanying drawings the machine is of a general box-like form and includes a bottom 10 and a pair of oppositely disposed upstanding walls 11 and 12, transversely spaced apart and of a length to accommodate the connecting rod $a$ therebetween. Opposite ends of the bottom 10 are provided with longitudinally extending inclined runways 13 and 14 upon which is mounted respectively clamping wedges 15 and 16 designed to be advanced towards the center of the device by means of advancing screws 17 and 18 carried by demountable end walls 19 and 20. Similarly the walls are connected across the top and adjacent opposite ends by bridge pieces 20 and 21, each of which is provided centrally thereof with a vertically movable clamping screw 22 and 23 and, on opposite sides of the center, with a pair of depending arms 24 carrying oppositely disposed clamping jaws 25 and 26 for securing the connecting rod against transverse movement. The two sets of jaws are spaced apart a distance so as to clamp the connecting rod at two widely spaced points as shown in Fig. 1.

The walls are each provided with three longitudinally spaced apart openings 27, 28, and 29, of which the aligned openings 27 and 29, of the opposite walls at one end will be referred to hereinafter as the crank pin bearing openings; the openings 29 at the opposite end will be referred to as the wrist pin bearing openings.

The openings 28 of which one is shown in Figures 1 and 4 are intended to be used in conjunction with the bolt holes 30 shown in the bottom 10 to machine the crank case bearings as is more fully disclosed in the above identified companion application.

It is understood that in the manufacture of this machine all parts which are intended to bear a definite relation, such as a parallel or right angled relation to other parts, are accurately machined to provide this relation for it will be obvious from this disclosure that the character of the resulting work will depend upon the accuracy with which the device is machined and the snugness of fit between moving parts.

Referring first to the construction at the right hand end of the machine and which is designed to provide an accurately machined bearing for the wrist pin $d$ it is noted from the showing in Figures 2 and 7 that the guiding openings 29 are disposed in transverse alignment with their common axis centered below the clamping screw 23. A pair of cylindrical center and tool holding and advancing guides 31 and 32 are fitted in the openings 29, are bolted through flanges 33 by means of bolts 34 engaging in bolt holes 35 surrounding each of the openings 29 as shown more particularly in Figure 7. The inner end 36 of one of the tool guides 32 is accurately machined to extend parallel to the length of the device and thus is accurately disposed at right angles to the axes of the guides 31 and 32. The guides are bored therethrough with their inner portion 37 (see Fig. 2) cylindrical and smooth to provide relatively long bearings for centers 38 which in the form illustrated in Figure 2 have tapered work engaging ends 39. The centers are designed to be advanced towards the work by means of feed nuts 40 working in the threaded outer end 41 of the bored guides and actuated by a hand crank 42 manipulated from the outside of the adjacent wall as shown in Figure 7.

There is shown in Figure 3 a cutting tool 43 which includes a centrally disposed collar 44 provided with an adjustable cutting knife 45 and which includes a pair of guiding shafts 46 projecting from opposite sides of the collar, having a sliding fit in the bores 37 and designed to be advanced by one of the nuts 40 in the manner suggested for the advance of the centers.

Let it be assumed that the connecting rod to be repaired is bodily twisted, the wrist pin bearing enlarged and distorted and that the bearing at the opposite end of the connecting rod is worn thus tending to shorten the length of the rod.

The first step of the operation is to bring the wrist pin head $b$ at least approximately into position at right angles to the length of the rod. This as is well known is usually effected by wrenching the parts or otherwise straightening the rod until the face $k$ at one end of the head is parallel to the general length of the rod. The machine parts are assembled as shown in Figure 2 but with the centers in open position in the tool guides, a cylindrical bushing 47 with trued ends is disposed between the trued face $k$ of the head and the trued end 36 of the tool guide 32. The head $b$ is disposed with its worn bearing $c$ between the centers and centers are screwed inwardly with their pointed ends engaging in the ends of the bearing as shown in Figure 2. This will have the effect of shifting the connecting rod bodily into position with the rod extending lengthwise of the machine and at right angles to the axis of the bearings to be machined. The axis of the bearing $c$ is concentrically disposed relative to the axis of the guides 31 and 32. When so located the connecting rod is clamped in position, first, by advancing the wedge 16 by its screw 18 into engagement with the underside of the head $b$ the screw 23 is advanced to engage the top of the bearing head $b$ and the clamping jaws 25 and 26 at both ends of the machine are moved laterally to engage the shank $f$ and the shell receiving head as shown in Figures 1 and 3. With the head thus clamped in position the centers are removed by reversing the controlling nuts 40 and the bushing 47 is removed together with one of the guides 32. The removal of this guide permits the insertion of the tool 43 into position, first by extending one of the shafts into the permanently disposed guide with the cutting element at one side of the bearing to be machined as shown in Figure 3.

The removed guide 32 is then reinserted into position as shown in dash-lines in this figure telescoping the other shaft. In this way the tool is mounted to work along the axis of the old bearing $c$. By means of the crank 42 acting on one of the nuts the tool is advanced as well as rotated through the bearing in the direction indicated by the arrow in Figure 3 to drill, ream, or otherwise machine the bearing to fit the wrist pin which it is desired to use. The cutting knife of the tool is set accurately so as to machine the bearing to have the usual snug but movable fit about the wrist or piston pin and it is obvious that a pin with any desired diameter may be used provided of course that it is not less than the maximum diameter of the old bearing. Should it be desired to machine one or both ends of the head $b$ the appropriate kind of tool is substituted for the boring machine tool illustrated, in which case of course, the tool is set to have a facing cut rather than a boring cut.

By this operation it is apparent that the bearing at this end of the connecting rod is accurately positioned centrally in the head $b$ at right angles to the length of the rod and of a size to fit the wrist pin to be used. The clamping devices are loosened at both ends of the rod the rod removed from the machine and a wrist pin is slipped into the machined bearing in the position which it is intended to assume when mounted in position in the piston.

The aligned crank pin bearing openings 27 at the left end of the machine are slightly larger than the holes 29 hereinbefore described, due to the fact that the bearing for receiving the shells $j$ is usually of larger diameter than the piston pin bearing at the other end of the connecting rod. The clamping screw 22 at this end differs slightly from the position of the screw 23 in that it is inset from the axis of the holes 27 so as to engage the yoke part $h$ of the crank pin head as shown in Figure 4.

The holes 27 are designed to be provided with outwardly extending tool guides 48 and 49 (see Fig. 6) corresponding in construction with the tool guides 31 and 32 described in connection with the guiding elements at the opposite end of the machine, except that they are larger to accommodate the larger holes in the machine walls. The guides 48 and 49 are designed to carry a locating gauge and centering tool 50 (see Figs. 4 and 8). This gauge is provided with a squared central hub 51 and cylindrical bearing ends or shafts 52 having a guiding fit in the smooth inner portions of the centers 48 and 49. Segmental bearing engaging face plates 53 are positioned on opposite sides of the hub 51 and are demountably fastened thereto by countersunk screws 54. In order to build out the hub to the diameter of either the finished crank pin bearing or to the diameter of the shell bearing shims 55 are positioned in equal number and thicknesses on opposite sides of the hub and between the same and the adjacent face plates as shown in Figures 4 and 8.

It is to be understood that the machining tool described in connection with the machining of the wrist pin bearing or a similar tool of a size to fit the larger guides 48 and 49 can be substituted in the guides 48 and 49 for the gage 50 to machine either the shell bearing shown in full lines in Figure 1 or to machine crank pin bearings shown in full lines in Figure 6 and in dotted lines in Figure 1 in the same manner as has been described in connection with the machining of the piston pin bearing.

For the purpose of testing the relation of the wrist pin relative to the axis e and for the purpose of locking the wrist pin in fixed position relative to this axis a sliding jig 56 is provided. This jig is a heavy broad base block mounted for longitudinal movement on the bottom 10 and secured in adjusted position by means of a bolt 57 passing through a slot 58 formed in the block and in screw threaded engagement with a bolt hole 59 in the bottom 10 and spaced from the openings 27 a distance equal to the average distance between the wrist pin and the crank pin bearings of the size of connecting rod which this device is intended to accommodate.

The jig is provided with a centrally disposed recess 60 designed to accommodate the head b and to provide access to the bolt 57. The recess has a width sufficient to accommodate heads b of different widths and to permit some lateral shifting of the head on the wrist pin if desired. The jig on opposite sides of the recess is provided with shouldered seats 61 having the faces 62 and 63 thereof disposed at right angles to each other as shown in Figure 4 so as to engage each of the lateral extensions of the wrist pin at two circumferentially spaced apart points as shown in Figure 4. The wrist pin is clamped in position on the seat by means of a pair of clamps 64 and 65 bridged across the wrist pin projections and secured to the jig by means of bolts 66. A clamping screw 67 is passed through the clamps to engage the wrist pin between the points of contact of the wrist pin with the seat so as to firmly clasp the pin to the seat and at the same time permit freedom of rotary movement between the connecting rod and the clamped wrist pin.

Assuming that the wrist pin is in correct position and that the cap i is removed from the rod, the gage tool is first built up with the shims 55 to give the diameter desired for the brasses when considered lengthwise of the rod and then inserted between the yoke h and cap i. If necessary shims plates n are inserted or removed from between the flat contacting faces of the yoke and cap and when a snug fit is attained the cap bolted in place by means of the bolts k. This step is most conveniently performed at the bench and away from the machine. The rod is then tested to ascertain if the axis e—e of the crank pin bearing opening is parallel to the axis of the located wrist pin. This is effected by positioning the connecting rod, with the locating gage removed, in the machine with the wrist pin locked to the sliding jig but the sliding jig itself is free to move longitudinally. The gage is inserted through one of the guides, through the shell bearing and with the advancing shaft extending into the other guide. It is obvious that the centering device shaft will not center the second tool guide until the axis l—l is parallel to the axis of the wrist pin and in this way there is provided a test for accuracy before the crank pin bearing is machined and even before the shells are mounted in place. When trued the clamping elements are moved to secure the rod in place to be machined, the bearing or shell halves are placed in position. In this operation the locating tool may be used as a wedging guide to force the bearings in opposite directions into both the crotch of the yoke h and into the cap, and in this way the halves of the bearings are forced into position mechanically thus eliminating the usual method of pounding the bearings into place. When the shell halves are placed into position the sliding jig is secured to its base; the locating tool or gage is withdrawn, a suitable machining tool is substituted for the gage and the bearing shells are machined in the manner heretofore suggested for the machining of the wrist pin bearing.

In this way it will be appreciated that the bearing shells for the crank pin bearings are machined strictly parallel to the axis of the wrist pin irrespective of the diameter of the wrist pin. As the axis of the wrist pin was previously set at right angles to the length of the connecting rod, the axis of the crank pin bearings must necessarily be at right angles to the length of the connecting rod.

With the sliding jig locked in position and with the same diameter of wrist pin used, it is apparent that a set of connecting rods may be trued so as to give the same distance between the axis of the wrist pin and the axis of the crank pin bearing for all of the rods of any one set. By this arrangement it is apparent that the connecting rods of the set are balanced for the machining is repeated for the different rods over identically the same machining axes for the several tools used.

It is also possible by changing the character of the boring tools to machine the flanged ends of the boring shells simply by substituting a different character of tool from the boring tool illustrated. In this way the length of the several shells of a set are trued so as to be equal to each other or of a prescribed length to fit between the arms of the engine crank on which they are to be mounted.

By practicing the method herein outlined it is possible to provide a set of connecting rods with the bearings at opposite ends in absolute parallelism and equally spaced apart so as to position all of the pistons on the same line as they reach the upper end of the cylinder in the actuation of the internal combustion engine of which they form a part.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In the art of truing a split crank shaft bearing of a connecting rod parallel to the axis of a wrist pin at the opposite end, the method which consists in disposing the bearing surface of the yoke portion of the rod at the split bearing in engagement with one side of a guide, positioning shims between the ends of the yoke and the cap thereon until the cap fits against the opposite side of the guide bolting the cap in position to complete the split bearing mounting the guide in position in a drilling machine with the guide parallel to the axis of the wrist pin, locking the rod in position removing the guide, substituting a cutting tool in place of the guide in the machine and machining the split bearing.

2. In the art of truing a split crank shaft bearing of a connecting rod parallel to the axis of a wrist pin at the opposite end, the method which consists in disposing the bearing surface of the yoke portion of the rod at the split bearing in engagement with one side of a guide positioning shims between the ends of the yoke and the cap thereon until the cap fits against the opposite side of the guide bolting the cap in position to complete the split bearing mounting the guide in position in a drilling machine with the guide parallel to the axis of the wrist pin, locking the rod in position removing the guide, positioning a bearing shell in the split bearing, substituting a cutting tool in place of the guide in the machine and machining the bearing shell.

3. In a device of the class described, the combination with a frame including a wall having an opening therethrough, a tool guide mounted in said opening and adapted to receive different tools, and a face of the guide disposed at right angles to the axis of the opening and adapted to provide a seat for a bushing adapted to coact with a tool carried by the guide, a tool for supporting a bushing in engagement with said wall, a bushing supported by the tool and means adapted to secure work to be machined in position engaging said supported bushing.

4. In a device of the class described, the combination of locating means for engaging the crank pin bearing at one end of a connecting rod containing a piston pin, said means including a gage for setting the diameter of the crank pin bearing and a jig provided with a seat for engaging the piston pin at the opposite end of the rod and means for securing the piston pin to the jig, said jig being adjustable lengthwise of rod and means for securing the same in adjusted position.

5. In a device of the class described, the combination of a tool guide adapted to locate a work engaging gage or to guide a tool in its operative relation to the gaged work, means for securing the work in advance of the tool guide and in position to be machined by the tool in the guide, a work support in spaced relation to one side of the guide, said work support provided with locating means for engaging a part of the work and thus setting the same in a definite relation to the part oppositely disposed to the tool guide.

Signed at New York city in the county of New York and State of New York this 30th day of December, A. D. 1920.

DAVID R. HARRINGTON.